(12) United States Patent
Nor et al.

(10) Patent No.: US 10,791,131 B2
(45) Date of Patent: Sep. 29, 2020

(54) PROCESSING NETWORK DATA USING A GRAPH DATA STRUCTURE

(71) Applicant: Hewlett Packard Enterprise Development LP, Houston, TX (US)

(72) Inventors: Igor Nor, Nor (IL); Eyal Hayun, Haifa (IL); Omer Barkol, Haifa (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 12 days.

(21) Appl. No.: 15/568,280

(22) PCT Filed: May 28, 2015

(86) PCT No.: PCT/US2015/032786
§ 371 (c)(1),
(2) Date: Oct. 20, 2017

(87) PCT Pub. No.: WO2016/190868
PCT Pub. Date: Dec. 1, 2016

(65) Prior Publication Data
US 2018/0152468 A1 May 31, 2018

(51) Int. Cl.
*H04L 29/06* (2006.01)
*H04L 12/24* (2006.01)
(Continued)

(52) U.S. Cl.
CPC .......... *H04L 63/1425* (2013.01); *H04L 41/12* (2013.01); *H04L 41/14* (2013.01);
(Continued)

(58) Field of Classification Search
CPC ... H04L 43/0876; H04L 63/145; H04L 41/12; H04L 41/14; H04L 43/045; H04L 43/08; H04L 61/15511; H04L 63/1425
(Continued)

(56) References Cited

U.S. PATENT DOCUMENTS 7,802,236 B2    9/2010   Calder et al.
9,195,829 B1 *  11/2015  Goradia ............... G06N 20/00
(Continued)

FOREIGN PATENT DOCUMENTS

WO        2016/122537 A1    8/2016

OTHER PUBLICATIONS

Aggarwal, C., et al., 'INARC I2.2: Large-Scale Information Network Processing Mid-Year Report. Network Science CTA', Mar. 2011. See pp. 4-10, 14, 21-22.; [retrieved on Oct. 6, 2015], Retrieved from the internet: <URL:http://hanj.cs.illinois.edu/APP/I2/I2.2.ppt>.

(Continued)

*Primary Examiner* — Brandon S Hoffman
*Assistant Examiner* — Nega Woldemariam
(74) *Attorney, Agent, or Firm* — Sheppard Mullin Richter & Hampton LLP

(57) ABSTRACT

Certain described examples are directed towards analyzing network data. The network data is processed to generate a graph data structure that has edges that are associated with communication times from the network data and nodes that are associated with computer devices. Representations of the graph data structure are generated over time. Given an indication of at least a computing device, for example as involved in anomalous activity or a security incident, the representations of the graph data structure may be used to determine further associated computer devices that are associated with the indicated device.

20 Claims, 4 Drawing Sheets

(51) Int. Cl.
*H04L 12/26* (2006.01)
*H04L 29/12* (2006.01)

(52) U.S. Cl.
CPC ............ *H04L 43/045* (2013.01); *H04L 43/08* (2013.01); *H04L 43/0876* (2013.01); *H04L 61/1511* (2013.01); *H04L 63/145* (2013.01)

(58) Field of Classification Search
USPC .......................................................... 726/23
See application file for complete search history.

(56) References Cited

U.S. PATENT DOCUMENTS

| | | | |
|---|---|---|---|
| 9,210,185 B1* | 12/2015 | Pinney Wood | G06F 16/9024 |
| 2010/0131564 A1 | 5/2010 | Pettovello | |
| 2011/0252032 A1 | 10/2011 | Fitzgerald et al. | |
| 2014/0164412 A1 | 6/2014 | Rosenberg et al. | |
| 2014/0330840 A1 | 11/2014 | Venkataramani et al. | |
| 2015/0020199 A1* | 1/2015 | Neil | H04L 63/1433 726/23 |
| 2015/0026158 A1 | 1/2015 | Jin | |
| 2015/0229662 A1* | 8/2015 | Hitt | H04L 63/1425 726/23 |
| 2016/0173446 A1* | 6/2016 | Nantel | H04L 63/1425 726/11 |
| 2017/0032274 A1* | 2/2017 | Yu | H04L 63/1425 |

OTHER PUBLICATIONS

Cerullo, G. et al.; "A Data-driven Framework for Critical Infrastructure Protection"; Oct. 14, 2014; http://www.dis.uniroma1.it/~tenace/download/deliverable/D3a.pdf.

Michail, O.;"An introduction to Temporal Graphs: an Algorithmic Perspective"; Mar. 1, 2015; http://arxiv.org/pdf/1503.00278.pdf.

Onwubiko, C.; "Security Information Management Systems"; Dec. 12, 2007; http://www.research-series.com/cyril/Guest-lecture-SIMS-Kingston-revised.pdf.

Tang, J. et al.; "Applications of Temporal Graph Metrics to Real-world Networks"; May 29, 2013; http://arxiv.org/pdf/1305.6974.pdf.

Tang, J. et al.; "STOP: Socio-temporal Opportunistic Patching of Short Range Mobile Malware"; Mar. 31, 2012; http://www.cl.cam.ac.uk/~cm542/papers/wowmom12.pdf.

"OpenDNS Security Graph", available online at <https://web.archive.org/web/20150605201436/https://labs.opendns.com/security-graph/>, Jun. 5, 2015, 2 pages.

International Search Report and Written Opinion received for PCT Application No. PCT/US2015/032786, dated Feb. 25, 2016, 11 pages.

Marcus A. Maloof: "Machine Learning and Data Mining for Computer Security: Methods and Applications", 2006, 225 pages.

Wikipedia, "Belief propagation", available online at <https://en.wikipedia.org/w/index.php?title=Belief_propagation&oldid=786954376>, Jun. 22, 2017, 7 pages.

Wikipedia, "Cluster analysis", available online at <https://en.wikipedia.org/w/index.php?title=Cluster_analysis&oldid=802956730>, Sep. 29, 2017,18 pages.

Wikipedia, "List of DNS record types", available online at <https://en.wikipedia.org/w/index.php?title=List_of_DNS_record_types&oldid=794905128>, Aug. 10, 2017, 10 pages.

Wikipedia, "PageRank", available online at <https://en.wikipedia.org/w/index.php?title=PageRank&oldid=799442332>, Sep. 7, 2017, 18 pages.

Wikipedia, "Root cause analysis", available online at <https://en.wikipedia.org/w/index.php?title=Root_cause_analysis&oldid=804000035>, Oct. 6, 2017, 4 pages.

Wikipedia, "tcpdump", available online at <https://en.wikipedia.org/w/index.php?title=Tcpdump&oldid=801212577>, Sep. 18, 2017, 3 pages.

* cited by examiner

```
300
<graph>
    <edge>
315     <nodes>(C1, C2)</nodes>        320
 A      [additional fields] — 335
        <timestamp>1421163927</timestamp>
    </edge>
    ...                    340
    <edge>
315     <nodes>(C1, C5)</nodes>
 B      [additional fields]
        <timestamp>1771163588</timestamp>
    </edge>
    ...
</graph>
```

*Fig. 3*

15 March 2015 - 07:00:32

Metrics

*Fig. 4*

PROCESSING NETWORK DATA USING A GRAPH DATA STRUCTURE

BACKGROUND

Modern computer network are often complex and involve the communication of large amounts of data. Such networks may be small-scale, such as within an office, or large-scale, such as the internet.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein:

FIG. 3 is a schematic illustration showing data representative of a graph data structure according to an example;

FIG. 4 is a schematic illustration of a graphical user interface for displaying graph data according to an example;

DETAILED DESCRIPTION

Figure 1:
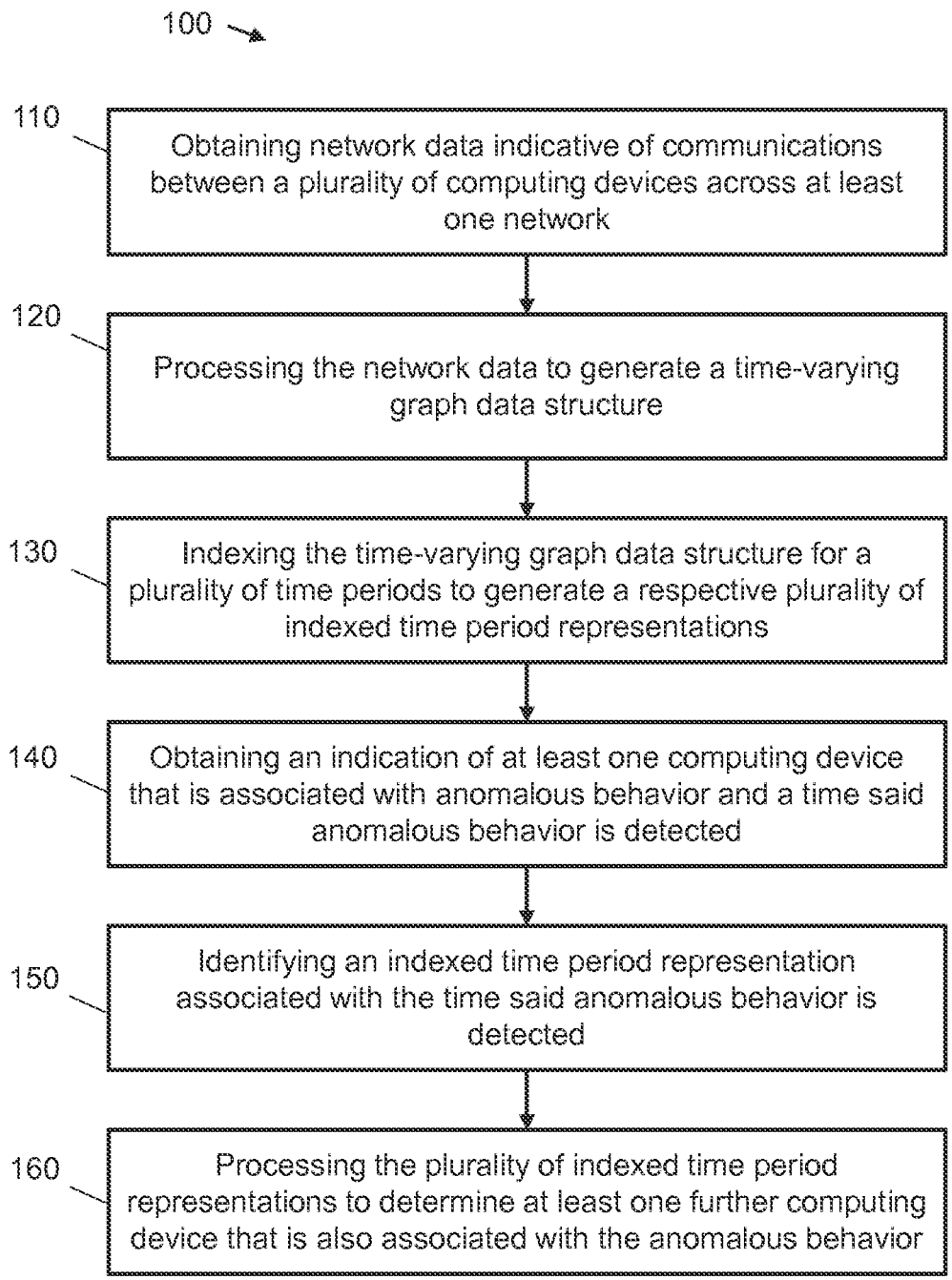
FIG. 1 is a flow diagram showing a method for analyzing network data according to an example.

Computer devices coupled to computer networks are often at risk from unintended or unauthorized access. In a network security incident, computers in a network may be compromised, for example by the infection with malicious computer program code. Such code may spread via communications between infected and non-infected computers. Similarly, the operation of computer servers may be disrupted by unauthorized intrusions and/or malicious network communications. The complexity of modern computer networks often makes it difficult to manage such an attack. For example, it is often difficult to determine: how a successful attack occurred; which computer devices on a network were compromised; which computer devices enabled the attack to take place, e.g. represent security vulnerabilities on the network; and/or the dynamics of the attack, e.g. how the attack evolved over time.

Certain examples described herein allow for useful processing of network data, for example network security data. These examples may be seen as a form of network data analysis. Certain examples obtain network data indicative of communications between computing devices across at least one network. The network data is then processed to generate a time-varying graph data structure comprising nodes, corresponding to computing devices, connected by edges, corresponding to communications between computing devices. A time-varying graph data structure comprises a graph data structure, e.g. with nodes coupled by edges, that changes over time. In present examples, the representations of the edges within the graph data structure include data describing the communication, including for example a time of the communication. This time of the communication may then be used as a time variable in the graph data structure, e.g. the graph data structure may have a time dimension as represented by at least one of nodes and edges having a time parameter value. In one case, a time-varying graph data structure may have a first structure, e.g. a first arrangement of nodes and edges, at a first point in time $t_1$ and a second structure, a second arrangement of nodes and edges, at a second point in time $t_2$. By constructing a time-varying or dynamic graph data structure using network data, network dynamics may be analyzed over a given time period; this may enable useful security data to be discerned. For example, by processing a time-varying graph data structure it may be possible to determine, amongst others, at least one of: how a successful attack occurred; which computer devices on a network were compromised; which computer devices enabled the attack to take place, e.g. represent security vulnerabilities on the network; which computer devices are infected following an attack; and the parameters that define the dynamics of the attack, e.g. how the attack evolved over time.

In certain examples, the graph data structure is indexed over a plurality of time periods to generate a set of indexed time period representations. These indexed time period representations may comprise snapshot representations of the graph data structure at particular points in time, together with at least one metric value as generated by the indexing process. In one case, the indexed time period representations may comprise representations of the graph data structure over given periods in time, or "frames" of data at a time t, together with at least one metric as described above. For example, a time period representation may comprise all the data of the graph data structure associated with a given time window or period. The indexed time period representations, and/or the metric values associated with those time period representations, may be used to analyze the security of a computer network. For example, they may be used to perform a root cause analysis, e.g. to identify computer devices that are either effecting, or have been affected by, a security incident.

In one described example, an indication is obtained of at least one computing device in the network which is associated with anomalous behavior, for example infection with malicious computer code. An indexed time period representation, associated with the time said anomalous behavior is detected, is then identified. Starting from that indexed time period representation, the indexed time period representations are processed to determine at least one further computing device that is also associated with the anomalous behavior. For example, this may comprise working forwards in time to identify other computing devices to which an infection may have spread. As another example, this may comprise working backwards in time to identify a computing device through which an infection entered the network.

FIG. 1 shows a method 100 for analyzing network data according to an example. In this case, the network data, obtained at block 110, is indicative of communications between a plurality of computing devices across at least one network. The network data may comprise network security data, i.e. network data pertaining to the security of at least one computer network. This may be any network data that may be used to determine security information, such as information pertaining to malicious attacks or network security breaches. In certain examples, the network data may pertain to any operations of computer devices upon the network, e.g. operations at any level of the Open Systems Interconnection model that involve the communication of data between network devices and the processing of said data. This need not be specifically associated with network security. For example, the network data may be analyzed to determine network efficiency gains, such as efficient bandwidth usage and/or loading characteristics over time.

At block 120, the network data is processed to generate a time-varying graph data structure comprising node representations coupled by edge representations. Each node representation corresponds to one of the plurality of computing devices. These may be, for example, mobile computing devices (so-called smartphones), personal computers, server devices, network-attached storage devices, routers, gateways or other known network devices. Each edge representation corresponds to a communication between two of said computing devices in the at least one network. Each edge representation comprises data regarding the communication with which it corresponds. In one case, this includes at least data indicating a time of the communication.

At block 130, the time-varying graph data structure is indexed for a plurality of time periods to generate a respective plurality of indexed time period representations. In one case, each indexed time period representation comprises edge representations with a time of communication within a given time period in the plurality of time periods. At a limit, time period representations may be generated for each time t in a measured time period. In another case, each time period representation may correspond to a range of time values, e.g. a time period $t_n$-$t_{n-1}$, that is one of a plurality of periods within a longer period of time. In certain cases, the indexing may comprise generating at least one indexing metric for each indexed time period representation. Examples of such indexing metrics are graph clustering metrics, belief propagation metrics and page rank metrics. Some metrics, such as belief propagation, provide information regarding the behavior of computers in the network. This information may be used at a later stage, for example when identifying computing devices associated with anomalous behavior, as described below.

At block 140, an indication is obtained of at least one computing device that is associated with anomalous behavior. A time said anomalous behavior is detected is also obtained. The anomalous behavior may, for example, comprise infection of a computer device with malicious computer code. The anomalous behavior may also comprise an indication of an attack on a computer device.

At block 150, an indexed time period representation is identified which is associated with the time said anomalous behavior is detected. This may comprise matching the obtained time with a corresponding time period representation time or time period.

At block 160, the plurality of indexed time period representations is processed to determine at least one further computing device that is also associated with the anomalous behavior. This processing may start from said identified indexed time period representation. As an example, the processing may comprise searching for nodes which, in a given time period representation, communicated with a node associated with anomalous behavior. The determination of at least one further computing device may be used as a guide for a security engineer, or may for example trigger an email to a security operator flagging the issue for investigation. The determination may in certain cases, be used to understand the security of the network in order to avoid future attacks by appropriately configuring security measures for the network.

In an example, each of the processed plurality of indexed time period representations is associated with a corresponding time after the time said anomalous behavior is detected. In such an example, the plurality of indexed time period representations are used to detect anomalous behavior exhibited by the at least one further computing device after the time said anomalous behavior is detected, such that the at least one further computing device is associated with an effect of anomalous behavior of the at least one computing device. In other words, the graph data structure may be rendered forwards in time in order to identify further computing devices which may have been infected by the computing device mentioned in block 140.

In a further example, each of the plurality of indexed time period representations is associated with a corresponding time before the time said anomalous behavior is detected. The plurality of indexed time period representations may then be used to detect anomalous behavior exhibited by the at least one further computing device before the time said anomalous behavior is detected, such that the at least one further computing device is associated with a cause of anomalous behavior the at least one computing device. In this manner, the graph may be rendered backwards in time in order to analyze, for example, how the computing device mentioned in block 140 became infected. In such an example, the at least one further computing device may be a source of an attack. Such a technique may be used to analyze the signature of an attack.

As such, the above-described method 100 allows an analysis of network data, for example data pertaining to the security of at least network, to take into account the time-varying nature of connections in the at least one network. This allows more accurate analysis of, for example, the signature of an attack on a system. Given an infected computer, this also allows more accurate predictions of further computers in the network that may be infected. The analysis may also be used to determine signatures of attacks across large scale wide area networks that comprise multiple interconnected networks.

In one implementation, the network data may comprise Domain Name System (DNS) data, i.e. data derived from the operation of at least one DNS. The data may be captured using a packet inspection tool, e.g. a so-called "sniffing tool", for example on a DNS server. Such a tool may capture incoming and outgoing network traffic for the DNS server. In this case, the packet inspection tool may build a frame container for each DNS request and response. This may enable a DNS record to be generated for a given network communication. Such a record may comprise at least one of, amongst others: a timestamp associated with the request and/or response; a network identifier such as a Media Access Control (MAC) address of the origin and destination of the communication; an indication of at least one protocol used for the communication, for example whether the Transmission Control Protocol (TCP) or the User Datagram Protocol (UDP) was used; a protocol version such as the Internet Protocol (IP) version (e.g. IPv4 or IPv6); a transaction identifier for a request and/or for the corresponding response; DNS flags; query information; and a list of authoritative nameservers. Further additional fields may also be captured.

In one example in which the network data is DNS data, generating the time-varying data structure comprises extracting, for each DNS record, the following data: the timestamp indicating when the DNS server replied to the request; the IP address of the client which requested a domain resolution; the domain associated with the request; the DNS record type, for example IP address, DNS zone authority, or name server; DNS message flags which indicate if the record in question is a request/response, and/or return a code such as "NoError", "ServFail", "NXDomain", indicating that the domain does not exist; the protocol type of the request; the IP version of the request or response; the number of answers found for the domain in question, the number of additional records when the domain has resolved more than one IP address; and/or the list of IP addresses assigned to the domain in question.

In this example, a graph is then constructed based on the network traffic, using at least a portion of the data detailed above. For example, each IP address may be associated with a node of the graph, with communications between IP addresses being associated with the edges. In certain examples, each node may be assigned a classification or "type" using the indexing. For example, this may be whether the IP address relates to an internal or external domain, or whether it is present on a network security blacklist (e.g. indicating known security threats), graylist (e.g. indicating unknown security threats), or whitelist (e.g. indicating trusted or secure known devices). Statistics may be gathered for each IP address, which may be added or linked to the node representation in the graph data structure, such as the number of requests made by that node, the number of responses answered by that node, or the amount of time that node was marked as not existing. Data may also be gathered describing which nodes behaved anonymously at a given time.

Figure 2A:
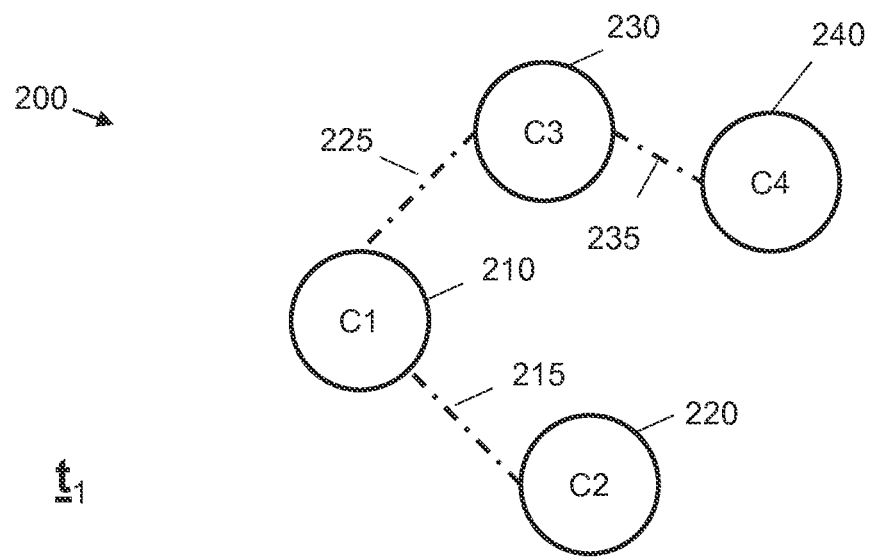
FIGS. 2A and 2B are schematic illustrations showing representations of time periods of a time-varying graph.
Figure 2B:
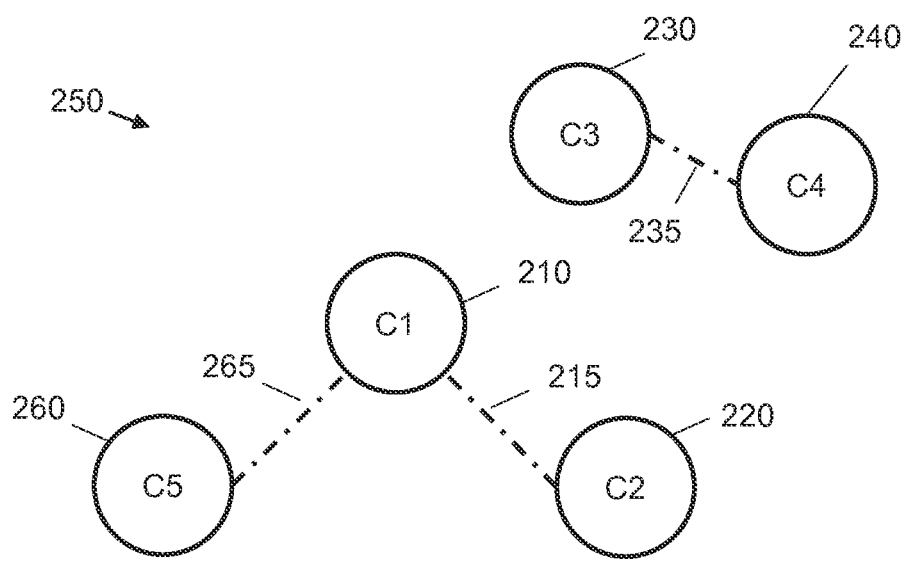

FIGS. 2A and 2B show example time period representations 200, 250 of a graph that may be constructed as described above. In this illustrative example, the time period representations comprise snapshots. FIG. 3 then shows an example 300 of a graph data structure 310 that may be used to define at least a portion of the graph shown in FIGS. 2A and 2B.

The graph time period representation 200 shown in FIG. 2A has four nodes and three edges. Node 210 corresponds to computer one (C1); node 220 corresponds to computer two (C2); node 230 corresponds to computer three (C3); and node 240 corresponds to computer four (C4). For example, each node may represent a separate IP address as described above. The nodes of FIG. 2A are linked by edges 215, 225 and 235. C1 is linked to C2 by edge 215 and to C3 by edge 225. C3 is linked to C4 by edge 235. The graph time period representation 200 in FIG. 2A relates to a first time or time period $t_1$. The graph time period representation 250 shown in FIG. 2B has five nodes and three edges. Nodes 210 to 240 correspond to computers C1 to C4 as indicated in FIG. 2A. As the graph time period representation 250 relates to a time-varying or dynamic graph data structure, the nodes and edges may change between time period representations. For example, nodes and/or edges may be added, modified or deleted as computer devices communication across the at least one network over time. The graph time period representation 250 of FIG. 2B relates to a time or time period $t_2$. At this time another node 260 corresponding to computer five (C5) is added to the graph data structure. The nodes of FIG. 2B are then linked by edges 215, 235 and 265. C1 is linked to C2 by edge 215 and to C5 by edge 265. C3 is linked to C4 by edge 240.

In this example, the edges indicate that a transmission was sent between the connected nodes within the time or time window corresponding to the time period representation in question. As such, nodes may appear and disappear over time. For example, C5 is not present in time period representation 200 but is present in time period representation 250. Edges may also appear and disappear in time. For example, C1 and C3 are connected in time period representation 200 but not in time period representation 250. The time period representations thus reflect the time variance of network traffic.

FIG. 3 shows an example of data that may result from processing network data to generate a time-dependent graph structure such as that indicated in the time period representations of FIGS. 2A and 2B. For example, the example 300 of FIG. 3 may result from block 120 of FIG. 1. FIG. 3 uses a pseudo-markup language to better explain the present example methods and apparatus; however, this format is not limiting and may vary between implementations.

In FIG. 3 a graph data structure 310 is defined between two "<graph></graph>" tags. The graph data structure 310 has a plurality of child tags 315 that represent edges of a graph, e.g. which comprise edge representations. Two edge representations are shown in FIG. 3: a first edge representation 315-A and a second edge representation 315-B. Each edge representation has a set of two or more node representations, in this example a tuple representing a source node and a destination node. These node representations may be defined in a separate list, array or dictionary data structure. Identifiers for the node representations are shown between "<node></node>" tags 320. The upper edge representation 315-A has a tuple "(C1, C2)" indicating that source node C1 is connected to destination node C2, e.g. as shown by edge 215 in graphs 200 and 250. The edge representation 315-A in FIG. 3 also comprises additional data fields 335. These may be any of the data fields described above, e.g. with reference to the DNS implementation. Each edge representation 315 in FIG. 3 also has a timestamp 340 indicated between a set of timestamp tags ("<timestamp></timestamp>"). This is representative of a date and/or time when a communication between the nodes. In this case timestamp 1421163927 is associated with time or time period $t_1$ and timestamp 1771163588 is associated with time or time period $t_2$. The second edge representation 315-B is shown to relate to edge 265 in graph 250, said edge associating C1 and C5.

FIG. 4 shows a schematic representation of an example Graphical User Interface (GUI) 400 which may be used to display the graph data structure generated in block 120 of FIG. 1, e.g. in the form of a dynamic representation comprising the indexed time period representations generated in block 130 of FIG. 1. Graphical representations of nodes 410, 420, 430, 440, 450 are shown, connected by edges. These nodes correspond to the nodes of graphs 200 and 250. In this example, the nodes are shaded according to node classifications that may result from the indexing procedure. For example: node 410 may be classified as an "external Uniform Resource Locator (URL); node 420 may be classified as an "internal URL"; node 430 may be classified as a "graylisted URL", node 440 may be classified as a "blacklisted URL" and node 450 may be classified as a "whitelisted URL".

At least one indexing metric, calculated as described above, may be displayed in the metrics box 460. This box, or a similar box, may also display statistics describing the graph, for example the number of blacklist URLs. In one case, at least one indexing metric may also be used to generate the graphical representation of the graph data structure. For example, a clustering metric may be used to determine locations for graphical representations of nodes, e.g. scaling of edges may be performed based on the clustering metric rather than, or as well as, distance between devices. This may result in an improved display of the network data.

The time and/or date of the present time period representation is shown at 470. In certain cases, this may be editable to enter a time and/or date to view. Buttons 480 may be used to increment or decrement this, selecting the next or previous time period representation. In one case user interface components may be provided to "play" through the time period representations, i.e. to move either forward or backward in time. In this case, the time and/or date 470 may change as time progresses or is rewound. Time period representations may also be selected by moving the sliding bar 490. This sliding bar 490 may indicate a position in a recorded time period. As time progresses or is rewound it may move respectively to the right or to the left in FIG. 4. The displayed node representations and/or edge representations change to reflect the currently selected time period representation. For example, as the dynamic representation is "played" nodes and/or edges may appear and/or disappear and the classification and/or other indexing metric may change.

Figure 5:
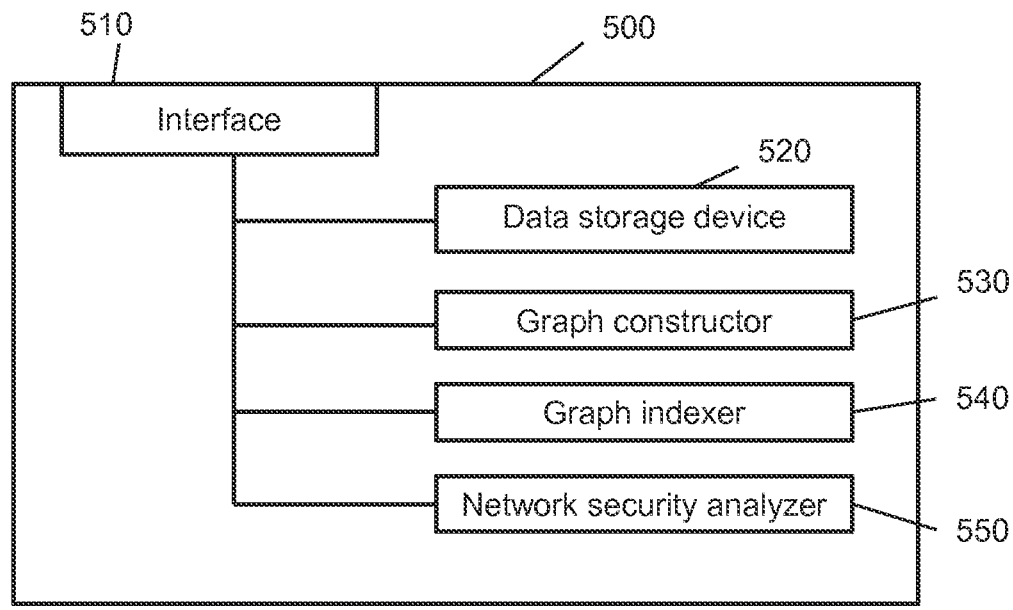
FIG. 5 is a schematic illustration of an apparatus for processing network data according to an example.

FIG. 5 shows a schematic illustration of an apparatus for analyzing network data according to an example 500. The apparatus comprises a data interface 510 configured to obtain network data from an accessible data storage device. The data interface 510 is connected to a data storage device 520, a graph constructor 530, a graph indexer 540, and a network security analyzer 550. In examples, the data interface 510 may be configured to implement a packet inspection tool on the at least one network to obtain the network data. In other examples, the data interface 510 may comprise a file system interface arranged to read data from a log file or the like stored in an external data storage device.

The data storage device 520 is configured to store a graph data structure, the graph data structure comprising node representations coupled by edge representations. The graph constructor 530 is configured to process the network data obtained via the data interface 510 and to construct the graph data structure. In an exemplary example, the graph constructor 530 is configured to represent computing devices indicated in the network data as nodes of the graph data structure and to represent communications between computing devices indicated in the network data as edges of the graph data structure. The graph constructor 530 may be further configured to store representations of the graph data structure over time by associating a time of communication between computing devices with each edge in the graph data structure. According to certain examples, the graph constructor 530 is configured to store a classification indication for each node representation. This may for example indicate that a node corresponds to an internal or external domain, or that a node is whitelisted, blacklisted or graylisted. The graph constructor 530 may be further configured to store representations of the graph data structure over time by associating a time of communication between computing devices with each edge in the graph data structure.

The graph indexer 540 is configured to index time period representations of the graph data structure, each time period representation comprising edges with a time of communication within a given time period, as described above with reference to FIG. 1 and as indicated in FIGS. 2A and 2B. In an example, the graph indexer may generate at least one indexing metric for each time period representation.

The network security analyzer 550 is configured to obtain an indication of at least one computing device and a time that are associated with a security incident, such as a malware infection. It is further configured to process the time period representations of the graph data structure from the graph indexer 540, starting from a time period representation associated with the obtained time, to determine at least one further computing device associated with the security incident.

According to some embodiments, the apparatus 500 may further comprise a display device configured to output a graphical representation of the graph data structure, for example as described above with reference to FIG. 4. The user interface may comprise user interface components enabling playback of changes of the graph data structure over time, such as any one of components 470, 480 and 490. This graphical representation may be generated using at least one metric generated by the graph indexer 540, e.g. as described above.

The components of FIG. 5 may be implemented in a variety of ways, depending on the particular application. These include as program instructions for execution by a processor, as logic circuits, as an application specific integrated circuit, or as firmware for execution by an embedded device. For example, the components may be implemented as any of software or firmware applications, computer implemented methods, program products stored on a computer useable medium, for execution on one of more processors (e.g. central processing unit or microcontroller) or other computing devices.

Figure 6:
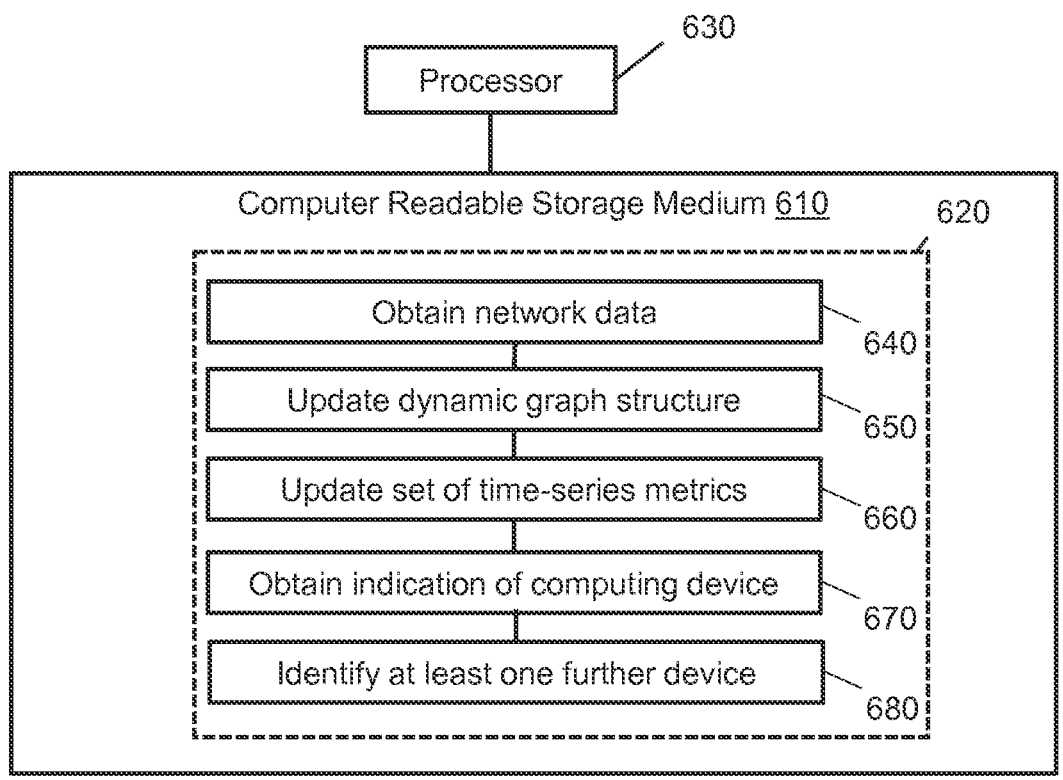
FIG. 6 is a diagram showing instructions encapsulated within a set of computer-readable instructions according to an example.

FIG. 6 depicts a non-transitory computer-readable storage medium 610 comprising a set of computer readable instructions 620 stored thereon which, when executed by at least one processor 630, cause the at least one processor to perform a method according to examples described herein. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In an example, instructions 620 cause the processor to, at block 640, obtain network data indicative of communications between a plurality of computing devices across at least one network within a particular time period. The network data may for example comprise, for each communication, a timestamp, a network identifier of a sending device and a network identifier of a receiving device. The network identifier may comprise, for example, at least one of: a MAC address, an IP address and a hostname. The network data may represent communications for a time t.

At block 650, the instructions cause the processor to process the network data to update a dynamic graph data structure to include the particular time period. For example, a dynamic graph data structure that covers time periods up to a time t−1 may be retrieved, e.g. from data storage, and updated to include data for the time t. The dynamic graph data structure represents a plurality of nodes coupled by edges, wherein each edge has an associated timestamp. The processing of the network data may include, for each communication in the network data, associating the network identifiers of the sending device and the receiving device with respective representations of nodes in the dynamic graph data structure. The processing may then include, for each communication, generating a representation of an edge associated with said representations of nodes and setting the associated timestamp of the edge to the timestamp of the communication.

In this example the instructions, at block 660, cause the processor to update a set of time-series metrics for the dynamic graph data structure to include the particular time period. These time-series metric may comprise any of the previously described indexing metrics, such as node rank, node clusters, and/or node classifications.

At block 670, the processor is caused to obtain an indication of at least one computing device within the plurality of computing devices that exhibits a presence of malicious computer code. At block 680, the processor is then caused to identify, using the set of time-series metrics and the indication of the at least one computing device, at least one further computing device within the plurality of computing devices that is deemed associated with the presence of malicious computer program code. As described above with reference to FIG. 1, this may for example comprise working forwards in time to identify computers infected by the at least one computing device. As another example, this may comprise working backwards in time to identify the source of the malicious code, for example an attack from at least one of the plurality of further computing devices.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the embodiments, or any combination of any other of the embodiments.

What is claimed is:

1. A method for analyzing network data, comprising:
   obtaining network data indicative of communications between a plurality of computing devices across at least one network;
   processing the network data to generate a time-varying graph data structure, the time-varying graph data structure comprising node representations coupled by edge representations, each node representation corresponding to one of the plurality of computing devices, each edge representation corresponding to a communication between two of said computing devices in the at least one network and comprising data indicating a time of the communication;
   indexing the time-varying graph data structure for a plurality of time periods to generate a respective plurality of indexed time period representations, each indexed time period representation of the time-varying graph data structure comprising edge representations with a time of communication within a given time period in the plurality of time periods;
   obtaining an identification of a first computing device within the plurality of computing devices that is associated with anomalous behavior and a first time said anomalous behavior is detected;
   generating the time-varying graph data structure comprising a first node representing the first computing device, a second node representing a second computing device, and an edge representation between the first node and the second node to illustrate the communication between the first node and the second node at the first time;
   starting from the first time, working forward in time to a second time to determine the communication between the first node and the second node at the second time;
   updating the time-varying graph data structure to illustrate the communication between the first node and the second node at the second time;
   determining that the second device is affected by the anomalous behavior at the second time based on the illustration of the communication in the updated time-varying graph data structure;
   working backward in time from the first time to a third time to determine a third node within the plurality of computing devices where the anomalous behavior entered the at least one network; and
   updating the time-varying graph data structure to illustrate the communication between the first node and the third node at the third time.

2. The method of claim 1, wherein the network data comprises network security data.

3. The method of claim 1, wherein the network data comprises Domain Name System data.

4. The method of claim 1, wherein the indexing comprises generating at least one indexing metric for each indexed time period representation.

5. The method of claim 4, wherein the at least one indexing metric comprises at least one of a graph clustering metric, a belief propagation metric, and a page rank metric.

6. The method of claim 1, wherein:
   each of the plurality of indexed time period representations is associated with a corresponding time after the time said anomalous behavior is detected; and
   the plurality of indexed time period representations are used to detect anomalous behavior exhibited by the at least one further computing device after the time said anomalous behavior is detected, such that the at least one further computing device is associated with an effect of anomalous behavior of the at least one computing device.

7. The method of claim 1, wherein:
   each of the plurality of indexed time period representations is associated with a corresponding time before the time said anomalous behavior is detected; and
   the plurality of indexed time period representations are used to detect anomalous behavior exhibited by the at least one further computing device before the time said anomalous behavior is detected, such that the at least one further computing device is associated with a cause of anomalous behavior the at least one computing device.

8. The method of claim 1, wherein the anomalous behavior is associated with an attack on the at least one computing device.

9. The method of claim 1, wherein said obtaining comprises:
   processing the plurality of indexed time period representations to determine the indication of at least one computing device within the plurality of computing devices that is associated with anomalous behavior and the time said anomalous behavior is detected.

10. An apparatus for analyzing network data comprising:
    a data interface to obtain network data from an accessible data storage device;
    a data storage device to store a graph data structure, the graph data structure comprising node representations coupled by edge representations;
    a graph constructor to process the network data obtained via the data interface and to construct the graph data structure,
    wherein the graph constructor is configured to represent computing devices indicated in the network data as nodes of the graph data structure and to represent communications between computing devices indicated in the network data as edges of the graph data structure, wherein the graph data structure comprises a first node, a second node, and an edge representation between the first node and the second node to illustrate the communication between the first node and the second node at a first time, wherein the graph constructor is further configured to store representations of the graph data structure over time by associating a first time of communication between the first node and the second node, working forward in time to a second time to determine the communication between the first node and the second node at the second time, and working backward in time from the first time to a third time to determine a third node where the anomalous behavior entered the network;

a graph indexer to index time period representations of the graph data structure, including the first time, the second time, and the third time, and each time period representation comprising edges with a time of communication within a given time period; and a network security analyzer to obtain an indication of the first node, the second node, and the third node corresponding with the first time, the second time, and the third time that are associated with a security incident and to process the time period representations of the graph data structure from the graph indexer.

11. The apparatus according to claim 10, comprising a display device configured to output a user interface comprising a graphical representation of the graph data structure, the user interface comprising user interface components enabling playback of changes in the graph data structure between the first time, the second time, and the third time.

12. The apparatus according to claim 11, wherein at least one metric generated by the graph indexer are used to generate the graphical representation of the graph data structure.

13. The apparatus according to claim 10, wherein the graph constructor is configured to store a classification indication for each node representation.

14. The apparatus according to claim 10, wherein the data interface is configured to implement a packet inspection tool on the at least one network to obtain the network data.

15. A non-transitory computer-readable storage medium comprising a set of computer-readable instructions stored thereon which, when executed by at least one processor, cause the at least one processor to:
obtain network data indicative of communications between a plurality of computing devices across at least one network;
process the network data to generate a time-varying graph data structure, the time-varying graph data structure comprising node representations coupled by edge representations, each node representation corresponding to one of the plurality of computing devices, each edge representation corresponding to a communication between two of said computing devices in the at least one network and comprising data indicating a time of the communication;
index the time-varying graph data structure for a plurality of time periods to generate a respective plurality of indexed time period representations, each indexed time period representation of the time-varying graph data structure comprising edge representations with a time of communication within a given time period in the plurality of time periods;
obtain an identification of a first computing device within the plurality of computing devices that is associated with anomalous behavior and a first time said anomalous behavior is detected;
generate the time-varying graph data structure comprising a first node representing the first computing device, a second node representing a second computing device, and an edge representation between the first node and the second node to illustrate the communication between the first node and the second node at the first time;
starting from the first time work forward in time to a second time to determine the communication between the first node and the second node at the second time;
determine that the second device is affected by the anomalous behavior at the second time based on the illustration of the communication in the updated time-varying graph data structure;
work backward in time from the first time to a third time to determine a third node within the plurality of computing devices where the anomalous behavior entered the at least one network; and
update the time-varying graph data structure to illustrate the communication between the first node and the third node at the third time.

16. The non-transitory computer-readable storage medium of claim 15, wherein the network data comprises network security data.

17. The non-transitory computer-readable storage medium of claim 15, wherein the network data comprises Domain Name System data.

18. The non-transitory computer-readable storage medium of claim 15, wherein the indexing comprises generating at least one indexing metric for each indexed time period representation.

19. The non-transitory computer-readable storage medium of claim 18, wherein the at least one indexing metric comprises at least one of a graph clustering metric, a belief propagation metric, and a page rank metric.

20. The non-transitory computer-readable storage medium of claim 15, wherein:
each of the plurality of indexed time period representations is associated with a corresponding time after the time said anomalous behavior is detected; and
the plurality of indexed time period representations are used to detect anomalous behavior exhibited by the at least one further computing device after the time said anomalous behavior is detected, such that the at least one further computing device is associated with an effect of anomalous behavior of the at least one computing device.

* * * * *